United States Patent [19]
Korematsu

[11] Patent Number: 5,978,478
[45] Date of Patent: Nov. 2, 1999

[54] TERMINAL ADAPTER

[75] Inventor: Toshiyuki Korematsu, Kawasaki, Japan

[73] Assignee: Fujitsu Limited, Kanagawa, Japan

[21] Appl. No.: 08/890,656

[22] Filed: Jul. 9, 1997

[30] Foreign Application Priority Data

Jan. 8, 1997 [JP] Japan ................................ 9-001065

[51] Int. Cl.⁶ ........................................ H04K 1/02
[52] U.S. Cl. .................... 380/9; 380/49; 380/23
[58] Field of Search .................... 380/9, 23, 25, 380/29, 59, 49; 370/524, 463; 395/285, 200.57; 379/399

[56] References Cited

U.S. PATENT DOCUMENTS 5,657,452  8/1997  Kralowetz et al. ............... 395/200.57

FOREIGN PATENT DOCUMENTS 1-117554   5/1989   Japan .
2-246443  10/1990   Japan .
5-328427  12/1993   Japan .

Primary Examiner—Tod R. Swann
Assistant Examiner—Trevor Coddington
Attorney, Agent, or Firm—Helfgott & Karas, P.C.

[57] ABSTRACT

A terminal adapter accommodates a data terminal device having an interface such as an RS-232C interface or the like in an ISDN. In response to an authentication request according to the CHAP from a peer, a first converting/transmitting unit transmits an authentication request according to the PAP to the data terminal device. For authentication in a B1 channel, the data terminal device transmits an ID and a password according to the PAP to the terminal adapter. A first transmitting unit encrypts the transmitted password and returns the encrypted password to the peer. A receiving/holding unit holds the ID and the password which have been transmitted. For authentication in the B1 channel, a second transmitting unit encrypts the password that has been held, and transmits the encrypted password to the peer.

4 Claims, 7 Drawing Sheets

TERMINAL ADAPTER

BACKGROUND OF THE INVENTION (1) Field of the Invention

The present invention relates to a terminal adapter for accommodating a data terminal device having an interface such as an RS-232C interface or the like in an ISDN (Integrated Services Digital Network), and more particularly to a terminal adapter capable of converting data between R-point asynchronous PPP and S/T-point multilink PPP.

(2) Description of the Related Art

The protocol of a data link layer, called Point-to-Point Protocol (PPP), is generally used for users to gain access to the Internet through a public network.

According to the PPP, only one logical link can be established with respect to one physical circuit. When, however, a protocol called multilink PPP is used, it is possible to regard a plurality of physical circuits (PPP links are established with respect to the respective physical circuits) as one logical link, logically enlarging a bandwidth.

Using the multilink PPP, two B channels of the ISDN may be regarded as one logical link to achieve an apparent transmission rate of 128 Kbps for faster access to the Internet.

In view of the above feature of the multilink PPP, it has heretofore been attempted to connect a data terminal device to a terminal of a terminal adapter with one physical circuit and also to connect two B channels of the ISDN to another terminal of the terminal adapter. The terminal adapter effects a protocol conversion between a PPP frame (not a multilink frame) from the data terminal device and a multilink PPP frame from the ISDN to realize faster access to the Internet.

The PPP and the multilink PPP have a negotiation function for using various options. When a link is established, a negotiation is carried out. In the negotiation, the type of an option to be used and the value of the option are carried in a Configure-Request-packet (hereinafter referred to as a "CR packet") to provide a request for using the option. If a party which has received the CR packet carrying the option which allows the option to be used, then the party returns a Configure-Acknowledge packet (hereinafter referred to as a "CA packet") which carries the same option type and option value. By following the above procedure, a PPP link is established including a setting for the user of the option.

There are available certain authentication protocols as such options for authenticating a party that has been connected. Among those authentication protocols are PAP (Password Authentication Protocol) and CHAP (Challenge-Handshake Authentication Protocol) which are finding frequent use in the art. According to the PAP, a party to be authenticated transmits an Authenticate-Request packet (hereinafter referred to as an "AR packet") which carries an ID and a password of its own in a text format to an authenticating party. If the authenticating party confirms that the party to be authenticated is permitted to use the link, then it transmits an A-ACK (Authenticate-Acknowledge) packet to the party to be authenticated. If the authenticating party cannot confirm that the party to be authenticated is permitted to use the link, then it transmits an A-NACK (Authenticate-Non-Acknowledge) packet to the party to be authenticated. Then, the authentication process of the PAP is finished.

According to the CHAP, an authenticating party transmits a challenge packet (hereinafter referred to as a "CHAL packet") which carries an ID and a challenge value of its own (hereinafter collectively referred to as an "encryption key") to a party to be authenticated. The challenge value is a random value which varies at all times. Having received the CHAL packet, the party to be authenticated encrypts its own password using the encryption key contained in the CHAL packet based on an MD5 algorithm, and transmits the encrypted password together with its own ID in a text format to the authenticating party.

The password encrypted on the basis of the MD5 algorithm cannot be restored to its original password. Therefore, the authenticating party searches a database for the password of the party to be authenticated based on the ID transmitted from the party to be authenticated, and encrypts the password with the encryption key that has previously been transmitted to the party to be authenticated. The authenticating party has the database which contains data about IDs and passwords of parties to be authenticated and also holds the encryption key that has previously been transmitted to the party to be authenticated.

If the password encrypted by the authenticating party agrees with the encrypted password transmitted from the party to be authenticated, then the authenticating party transmits a response packet (hereinafter referred to as a "RESP packet") which carries a success code representing an authentication success to the party to be authenticated. If the password encrypted by the authenticating party disagrees with the encrypted password transmitted from the party to be authenticated, then the authenticating party transmits a RESP packet which carries a failure code representing an authentication failure to the party to be authenticated.

For authenticating a party according to the multilink PPP, it is necessary to authenticate the party with respect to each physical link in a multilink system. For example, if two B channels (B1 channel and B2 channel) of the ISDN are put together as one logical link, then the party is authenticated with respect to the B1 channel and thereafter the party is authenticated with respect to the B2 channel. Such an authentication process will be described according to the PAP with reference to FIG. 6 of the accompanying drawings, and will be described according to the CHAP with reference to FIG. 7 of the accompanying drawings.

FIG. 6 shows a link establishing sequence and an authentication sequence according to the PAP. In FIG. 6, "DTE" represents a data terminal device, "TA" a terminal adapter, and "PEER" an ISDN device such as an access server. At an R point between the DTE and the TA, there is one physical link to which the asynchronous PPP is applied. At an S/T point between the TA and the PEER, there are two ISDN B channels to which the multilink PPP is applied. The ID and password of DTE to be authenticated are registered as being associated with each other in the PEER. The link establishing sequence and the authentication sequence shown in FIG. 6 will be described below with respect to successive steps.

[P21] Before this step, the B1 channel is called. Thereafter, the PEER sends a CR packet with the PAP indicated as an authentication protocol (AP) to the TA, providing a request to establish a link.

[P22] The TA transfers the CR packet to the DTE.

[P23] Since the establishment of a link is allowable and the use of the PAP is allowable, the DTE transmits a CA packet which carries the PAP to the TA.

[P24] The TA transfers the CA packet to the PEER.

[P25] The DTE sends an AR packet carrying its own ID and password to the TA, providing an authentication request.

[P26] The TA transmits the AR packet to the PEER, reads the ID and password contained in the AR packet and stores them in a memory.

[P27] The PEER compares the transmitted ID and password with registered IDs and passwords. If they agree, PEER transmits an A-ACK packet representing an authentication success to the TA.

[P28] The TA transfers the A-ACK packet to the DTE.

In this manner, the link establishing sequence and the authentication sequence for the B1 channel are completed. The steps [P21] through [P28] are carried out transparently between the PEER and the DTE.

[P29] Before this step, the B2 channel is called. Thereafter, the PEER sends a CR packet with the PAP indicated as an authentication protocol (AP) to the TA, providing a request to establish a link.

[P30] Since it is already known that the establishment of a link is allowable and the use of the PAP is allowable, the TA transmits a CA packet which carries the PAP to the PEER.

[P31] The TA reads the ID and password of the DTE from the memory, and transmits an AR packet carrying the ID and password to the PEER, providing an authentication request.

[P32] The PEER compares the transmitted ID and password with registered IDs and passwords. If they agree, the PEER transmits an A-ACK packet representing an authentication success to the TA.

In this manner, the link establishing sequence and the authentication sequence for the B2 channel are completed. The steps [P29] through [P32] are terminated at the TA.

FIG. 7 shows a link establishing sequence and an authentication sequence according to the CHAP. For authentication according to the CHAP, the ID and password of the DTE are registered beforehand in TA. The ID and password of the DTE to be authenticated are registered as being associated with each other in the database of the PEER. The link establishing sequence and the authentication sequence shown in FIG. 7 will be described below with respect to successive steps.

[P41] Before this step, the B1 channel is called. Thereafter, the PEER sends a CR packet with the CHAP indicated as an authentication protocol (AP) to the TA, providing a request to establish a link.

[P42] The TA converts the authentication protocol (AP) to "no authentication," and transfers the CR packet to the DTE. Since no authentication process is carried out between the TA and the DTE, the authentication protocol (AP) is converted to "no authentication."

[P43] Since the establishment of a link is allowable, the DTE transmits a CA packet carrying the authentication protocol (AP) representing "no authentication" to the TA.

[P44] The TA converts the authentication protocol (AP) back to the original CHAP, and transfers the CA packet to the PEER.

[P45] The PEER sends a CHAL packet carrying an encryption key to the TA, and holds the encryption key.

[P46] The TA extracts the encryption key from the transmitted CHAL packet, and reads the ID and password of the DTE which have been registered in advance. Based on the MD5 algorithm, the TA encrypts the read password of the DTE using the extracted encryption key. The TA transmits the CHAL packet carrying the encrypted password and the read ID in a text format to the PEER.

[P47] The PEER extracts the ID and encrypted password from the CHAL packet which has been transmitted thereto. The PEER then searches the database for a password corresponding to the extracted ID, and encrypts the located password using the encryption key that has been kept in the step [P45]. If the encrypted password agrees with the encrypted password transmitted from the TA, then the PEER transmits a RESP packet which carries a success code representing an authentication success to the TA.

The link establishing sequence and the authentication sequence for the B1 channel are now completed.

[P48] Before this step, the B2 channel is called. Thereafter, the PEER sends a CR packet with the CHAP indicated as an authentication protocol (AP) to the TA, providing a request to establish a link.

[P49] Since it is already known that the establishment of a link is allowable and the use of the CHAP is allowable, the TA transmits a CA packet which carries the CHAP to the PEER.

[P50] The PEER sends a CHAL packet carrying an encryption key Key* to the TA, and holds the encryption key Key*. The encryption key Key* which is carried on the CHAL packet in the step [P50] has a different challenge value, and hence has a value different from the encryption key which has been carried on the CHAL packet in the step [P45].

[P51] The TA extracts the encryption key Key* from the transmitted CHAL packet, and reads the ID and password of the DTE which have been registered in advance. Based on the MD5 algorithm, the TA encrypts the read password PW of the DTE using the extracted encryption key Key*. The TA transmits the CHAL packet carrying the encrypted password PW* and the read ID in a text format to the PEER.

[P52] The PEER extracts the ID and encrypted password PW* from the CHAL packet which has been transmitted thereto. The PEER then searches the database for a password corresponding to the extracted ID, and encrypts the located password using the encryption key Key* that has been kept in the step [P50]. If the encrypted password agrees with the encrypted password PW* transmitted from the TA, then the PEER transmits a RESP packet which carries a success code representing an authentication success to the TA.

The link establishing sequence and the authentication sequence for the B2 channel are now completed. The steps [P45] through [P52] are terminated at the TA.

In the authentication process according to the CHAP shown in FIG. 7, it is necessary to register the ID and password of the DTE in the TA. The reasons for registering the ID and password of the DTE in the TA will be described below.

If the DTE and the PEER were to communicate with each other transparently as according to the PAP shown in FIG. 6, the DTE encrypts its own password using the encryption key according to the MD5 algorithm, and transmits the encrypted password through the TA to the PEER. Inasmuch as the password, once encrypted according to the MD5 algorithm, cannot be restored to the original password, the TA is unable to recognize the password of the DTE from the encrypted password. Even if the TA kept the password of the DTE, the TA would fail to terminate the authentication sequence for the B2 channel in the same manner as with the PAP. The encrypted password kept in the authentication sequence for the B1 channel cannot be used in the authentication sequence for the B2 channel because the encryption key which the TA receives from the PEER in the authentication sequence for the B2 channel is different from the encryption key which the TA has received from the PEER in the authentication sequence for the B1 channel.

For the above reasons, it has been customary to register the ID and password of the DTE in the TA.

With the above process, however, if the DTE selectively uses a plurality of sets of IDs and passwords, then an ID and password registration procedure is complex to carry out.

Specifically, an application program (e.g., a PPP dialer) that can be installed in the DTE generally has a telephone book function capable of registering a plurality of different settings. Such an application program allows a plurality of sets of IDs and passwords to be registered. If the DTE contracts a plurality of Internet service providers, then the DTE can use different IDs and passwords for the respective Internet service providers. With the conventional authentication process according to the CHAP, however, it is necessary to register a set of ID and password in the TA, and each time the DTE changes its ID and password for connection to a different Internet service provider, a new set of ID and password has to be registered again in the TA. Therefore, the ID and password registration procedure is tedious and time-consuming to carry out.

Another problem is that because a set of ID and password is registered in the TA, there is a danger that the registered ID and password may possibly be stolen if the TA is carried away by an unauthorized person.

SUMMARY OF THE INVENTION

It is therefore an object of the present invention to provide a terminal adapter which is not required to register an ID and a password for an authentication process for multilink PPP according to the CHAP.

To accomplish the above object, there is provided a terminal adapter for converting data between R-point asynchronous PPP and S/T-point multilink PPP, comprising first receiving means for receiving from a peer a first link establishment request packet according to a first authentication protocol using an encrypted password, first converting/transmitting means for converting the first link establishment request packet received by the first receiving means to a second link establishment request packet according to a second authentication protocol using a password in a text format and transmitting the second link establishment request packet to a data terminal device, second receiving means for receiving a first response packet according to the second authentication protocol which is returned from the data terminal device in response to the reception of the second link establishment request packet, and second converting/transmitting means for converting the first response packet received by the second receiving means to a second response packet according to the first authentication protocol and transmitting the second response packet to the peer.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

The principles of the present invention will first be described below with reference to FIG. 1.

Figure 1:
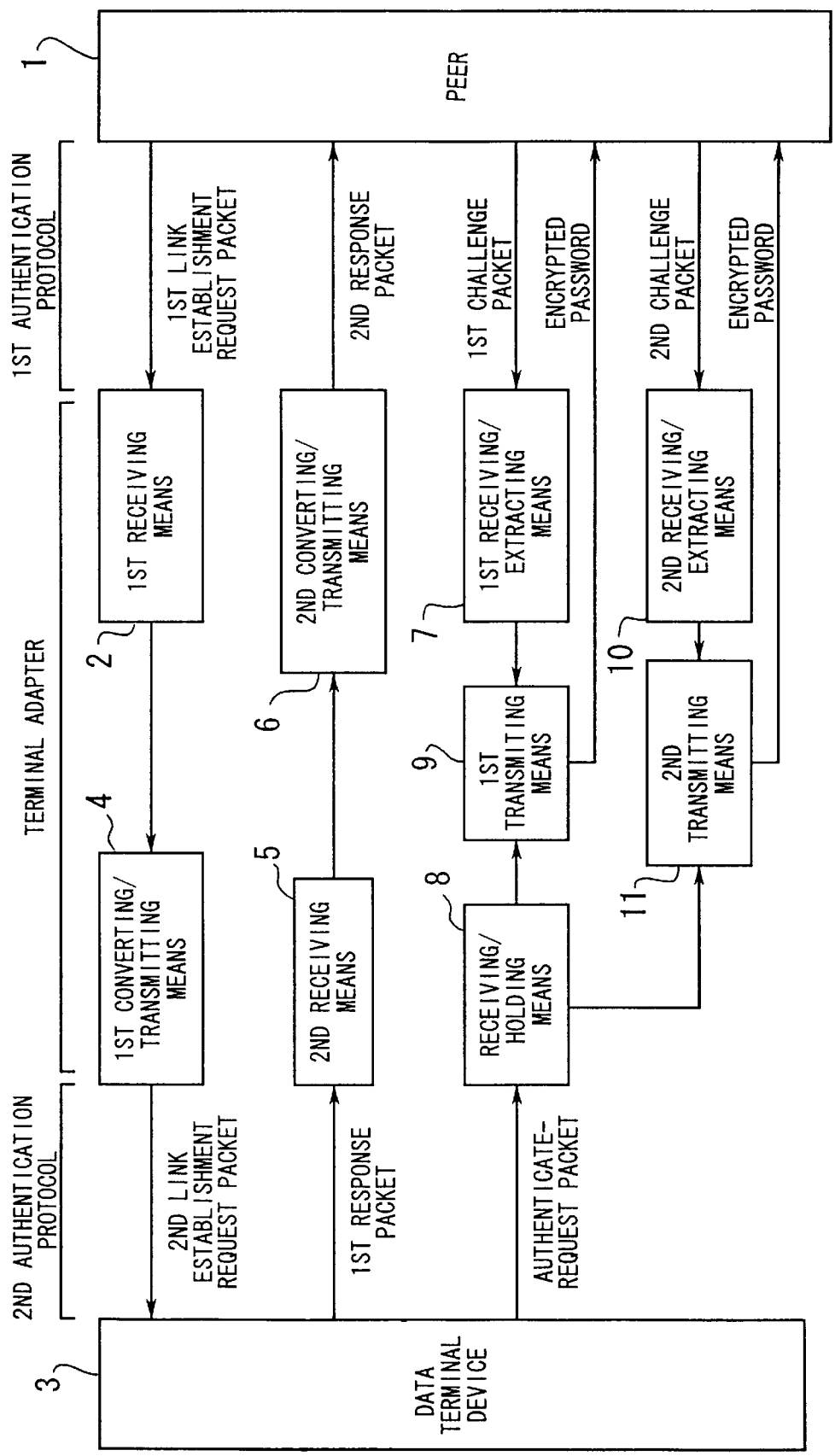
FIG. 1 is a block diagram illustrative of the principles of the present invention.

As shown in FIG. 1, a terminal adapter according to the present invention comprises first receiving means 2 for receiving from a peer 1 a first link establishment request packet according to a first authentication protocol using an encrypted password, first converting/transmitting means 4 for converting the first link establishment request packet received by the first receiving means 2 to a second link establishment request packet according to a second authentication protocol using a password in a text format and transmitting the second link establishment request packet to a data terminal device 3, second receiving means 5 for receiving a first response packet according to the second authentication protocol which is returned from the data terminal device 3 in response to the reception of the second link establishment request packet, and second converting/transmitting means 6 for converting the first response packet received by the second receiving means 5 to a second response packet according to the first authentication protocol and transmitting the second response packet to the peer 1.

The terminal adapter further comprises first receiving/extracting means 7 for receiving a first challenge packet transmitted from the peer 1 and extracting a first encryption key contained in the first challenge packet, receiving/holding means 8 for receiving an authentication request packet transmitted from the data terminal device 3 and holding an ID and a password in a text format which are contained in the authentication request packet, and first transmitting means 9 for reading the password held by the receiving/holding means 8, encrypting the password with the first encryption key extracted by the first receiving/extracting means 7, reading the ID held by the receiving/holding means 8, and transmitting the ID and the encrypted password to the peer 1.

The terminal adapter further comprises second receiving/extracting means 10 for receiving a second challenge packet transmitted from the peer 1 and extracting a second encryption key contained in the second challenge packet, and second transmitting means 11 for reading the password held by the receiving/holding means 8, encrypting the password with the second encryption key extracted by the second receiving/extracting means 10, reading the ID held by the receiving/holding means 8, and transmitting the ID and the encrypted password to the peer 1.

For establishing a link in a first physical circuit, the first receiving means 2 receives the first link establishment request packet according to the first authentication protocol from the peer 1. The first converting/transmitting means 4 converts the first link establishment request packet to the second link establishment request packet according to the second authentication protocol and transmits the second link establishment request packet to the data terminal device 3. Specifically, the first converting/transmitting means 4 converts the protocol of the first link establishment request packet from the first authentication protocol (e.g., the CHAP) to the second authentication protocol (e.g., the PAP), generating the second link establishment request packet, and then transmits the second link establishment request packet to the data terminal device 3.

When the data terminal device 3 receives the second link establishment request packet, the data terminal device 3 generates the first response packet according to the second authentication protocol, and returns the first response packet to the terminal adapter. The second receiving means 5 of the terminal adapter receives the first response packet. The second converting/transmitting means 6 converts the first response packet to the second response packet according to the first authentication protocol and transmits the second response packet to the peer 1. Specifically, the second converting/transmitting means 6 converts the protocol of the first response packet from the second authentication protocol to the first authentication protocol, generating the second response packet, and transmits the second response packet to the peer 1.

For authentication in the first physical circuit, the first receiving/extracting means 7 receives the first challenge packet transmitted from the peer 1 and extracts the first encryption key contained in the first challenge packet. The receiving/holding means 8 receives the authentication request packet transmitted from the data terminal device 3 and extracts and holds the ID and the password in the text format which are contained in the authentication request packet. The first transmitting means 9 reads the password held by the receiving/holding means 8, encrypts the password with the first encryption key extracted by the first receiving/extracting means 7, reads the ID held by the receiving/holding means 8, and transmits the ID and the encrypted password to the peer 1.

For authentication in the second physical circuit after the authentication in the first physical circuit, the second receiving/extracting means 10 receives the second challenge packet transmitted from the peer 1 and extracts the second encryption key contained in the second challenge packet. The second encryption key is different from the first encryption key. The second transmitting means 11 reads the password held by the receiving/holding means 8, encrypts the password with the second encryption key extracted by the second receiving/extracting means 10, reads the ID held by the receiving/holding means 8, and transmits the ID and the encrypted password to the peer 1.

Consequently, in response to an authentication request according to the first authentication protocol (e.g., the CHAP) from the peer 1, the terminal adapter transmits an authentication request according to the second authentication protocol (e.g., the PAP) to the data terminal device 3.

For authentication in the first physical circuit, the data terminal device 3 transmits an ID and a password to the terminal adapter according to the second authentication protocol (e.g., the PAP). Using the ID and the password which have been transmitted, the terminal adapter encrypts the password according to the first authentication protocol (e.g., the CHAP), and transmits the encrypted password to the peer 1. At the same time, the terminal adapter holds the ID and the password which have been transmitted.

For authentication in the second physical circuit, the terminal adapter uses the ID and the password which have been held to encrypts the password according to the first authentication protocol (e.g., the CHAP), and transmits the encrypted password to the peer 1.

According to the present invention, as described above, it is not necessary to register an ID and a password in the terminal adapter. No process is thus needed to register an ID and a password in the terminal adapter. When the data terminal device uses a different set of ID and password, it is not required to be registered again in the terminal adapter.

Even when an unauthorized person carries away the terminal adapter, there is no risk of theft of any ID and password from the terminal adapter.

Operation of the terminal adapter will be described in detail with reference to FIG. 2.

Figure 2:
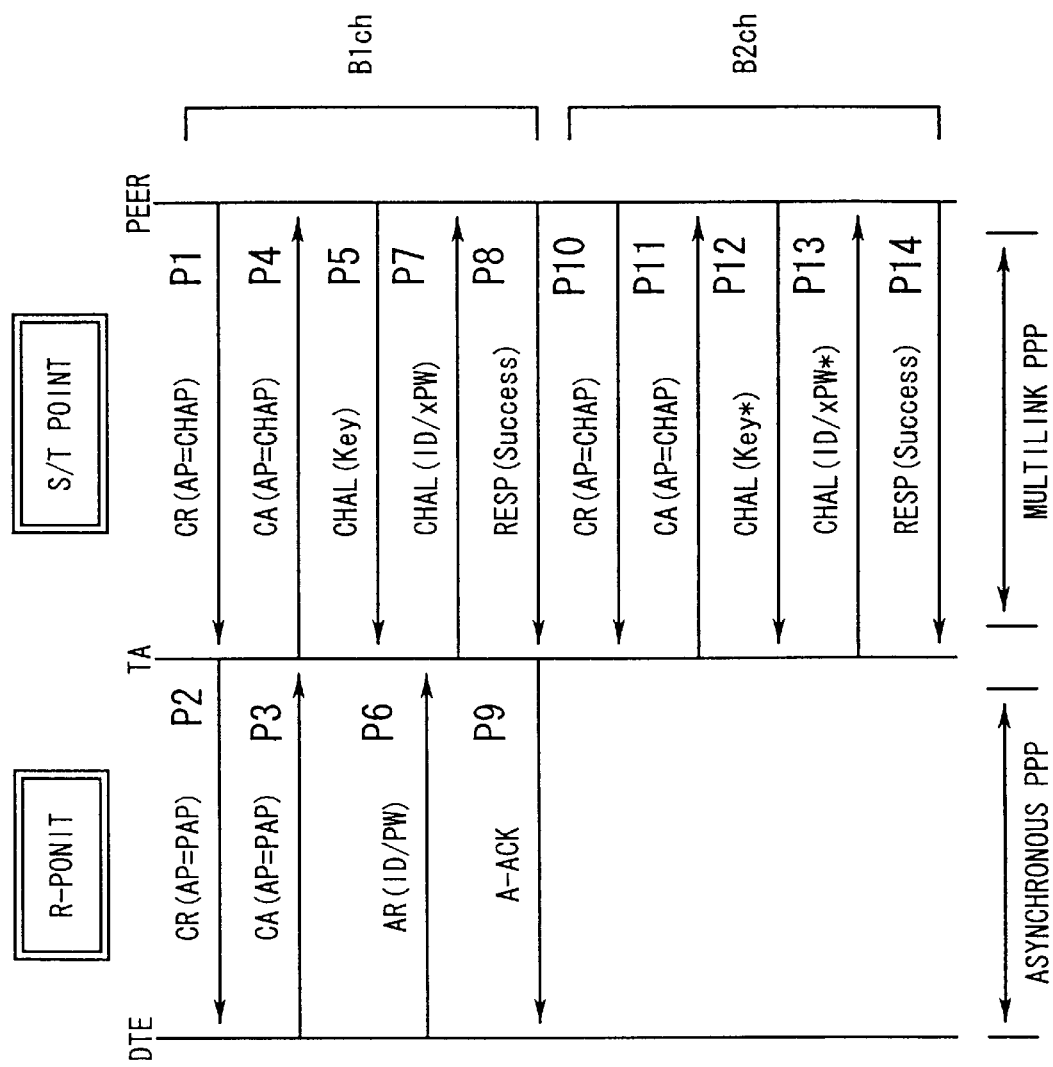
FIG. 2 is a diagram showing a link establishing sequence and an authentication sequence according to a first protocol in a terminal adapter according to the present invention.

FIG. 2 shows a link establishing sequence and an authentication sequence according to the first authentication protocol in the terminal adapter. It is assumed in FIG. 2 that the first authentication protocol is the CHAP and the second authentication protocol is the PAP. In FIG. 2, "DTE" represents the data terminal device 3, "TA" the terminal adapter, and "PEER" the peer 1. At an R point between the DTE and the TA, there is one physical link to which the asynchronous PPP is applied. At an S/T point between the TA and the PEER, there are two ISDN B channels (B1 channel and B2 channel) to which the multilink PPP is applied. The peer 1 may comprise an ISDN access server, for example, and an ID and password of the data terminal device to be authenticated are registered as being associated with each other in the peer 1. The link establishing sequence and the authentication sequence shown in FIG. 2 will be described below with respect to successive steps.

[P1] Before this step, the B1 channel is called. Thereafter, the peer 1 sends a CR packet (the first link establishment request packet) with the CHAP indicated as an authentication protocol (AP) to the first receiving means 2 of the terminal adapter.

[P2] The first converting/transmitting means 4 converts the authentication protocol (AP) to the PAP, and transmits the CR packet (the second link establishment request packet) to the data terminal device 3.

[P3] Since the establishment of a link is allowable and the use of the PAP is allowable, the data terminal device 3 transmits a CA packet (the first response packet) which carries the PAP to the second receiving means 5 of the terminal adapter.

[P4] The second converting/transmitting means 6 converts the authentication protocol (AP) back to the CHAP, and transmits the CA packet (the second response packet) to the peer 1.

[P5] According to the CHAP, the peer 1 sends a CHAL packet (the first challenge packet) which carries an encryption key Key to the first receiving/extracting means 7 of the terminal adapter, and holds the encryption key Key. The first receiving/extracting means 7 receives the CHAL packet, and extracts the encryption key Key from the CHAL packet.

[P6] According to the PAP, the data terminal device 3 transmits an AR packet (the authentication request packet) carrying its own ID and password to the receiving/holding means 8 of the terminal adapter. The receiving/holding means 8 receives the AR packet, extracts the ID and password from the AR packet, and holds them.

[P7] Using the encryption key extracted by the first receiving/extracting means 7, the first transmitting means 9 encrypts the password held by the receiving/holding means 8 according to the MD5 algorithm. The first transmitting means 9 then transmits the CHAL packet carrying the encrypted password and the ID in the text format held by the receiving/holding means 8 to the peer 1.

[P8] The peer 1 searches the database for a password of the data terminal device 3 which corresponds to the ID transmitted from the first transmitting means 9. The peer 1 then encrypts the located password with the encryption key held in the step [P5]. If the encrypted password agrees with the encrypted password transmitted from the first transmitting means 9, then the peer 1 transmits a RESP packet which carries a success code representing an authentication success to the terminal adapter.

[P9] The terminal adapter converts the RESP packet to an A-ACK packet representing an authentication success, and transmits the A-ACK packet to the data terminal device 3.

The link establishing sequence and the authentication sequence for the B1 channel are now completed.

[P10] Before this step, the B2 channel is called. Thereafter, the peer 1 sends a CR packet with the CHAP indicated as an authentication protocol (AP) to the terminal adapter, providing a request to establish a link.

[P11] Since it is already known that the establishment of a link is allowable and the use of the CHAP is allowable, the terminal adapter transmits a CA packet which carries the CHAP to the peer 1.

[P12] According to the CHAP, the peer 1 sends a CHAL packet (the second challenge packet) carrying an encryption key Key* to the second receiving/extracting means 10 of the terminal adapter, and holds the encryption key Key*. The encryption key Key* which is carried on the CHAL packet in the step [P12] has a value different from the encryption key Key which is carried on the CHAL packet in the step [P5]. The second receiving/extracting means 10 receives the CHAL packet and extracts the encryption key from the CHAL packet.

[P13] Using the encryption key extracted by the second receiving/extracting means 10, the second transmitting means 11 encrypts the password held by the receiving/holding means 8 according to the MD5 algorithm. The second transmitting means 11 then transmits the CHAL packet carrying the encrypted password and the ID in the text format held by the receiving/holding means 8 to the peer 1.

[P14] The peer 1 searches the database for a password which corresponds to the ID transmitted from the second transmitting means 11. The peer 1 then encrypts the located password with the encryption key held in the step [P12]. If the encrypted password agrees with the encrypted password transmitted from the second transmitting means 11, then the peer 1 transmits a RESP packet which carries a success code representing an authentication success to the terminal adapter.

In this manner, the link establishing sequence and the authentication sequence for the B2 channel are completed. In FIG. 2, the steps [P10] through [P14] are terminated at the terminal adapter.

Figure 3:
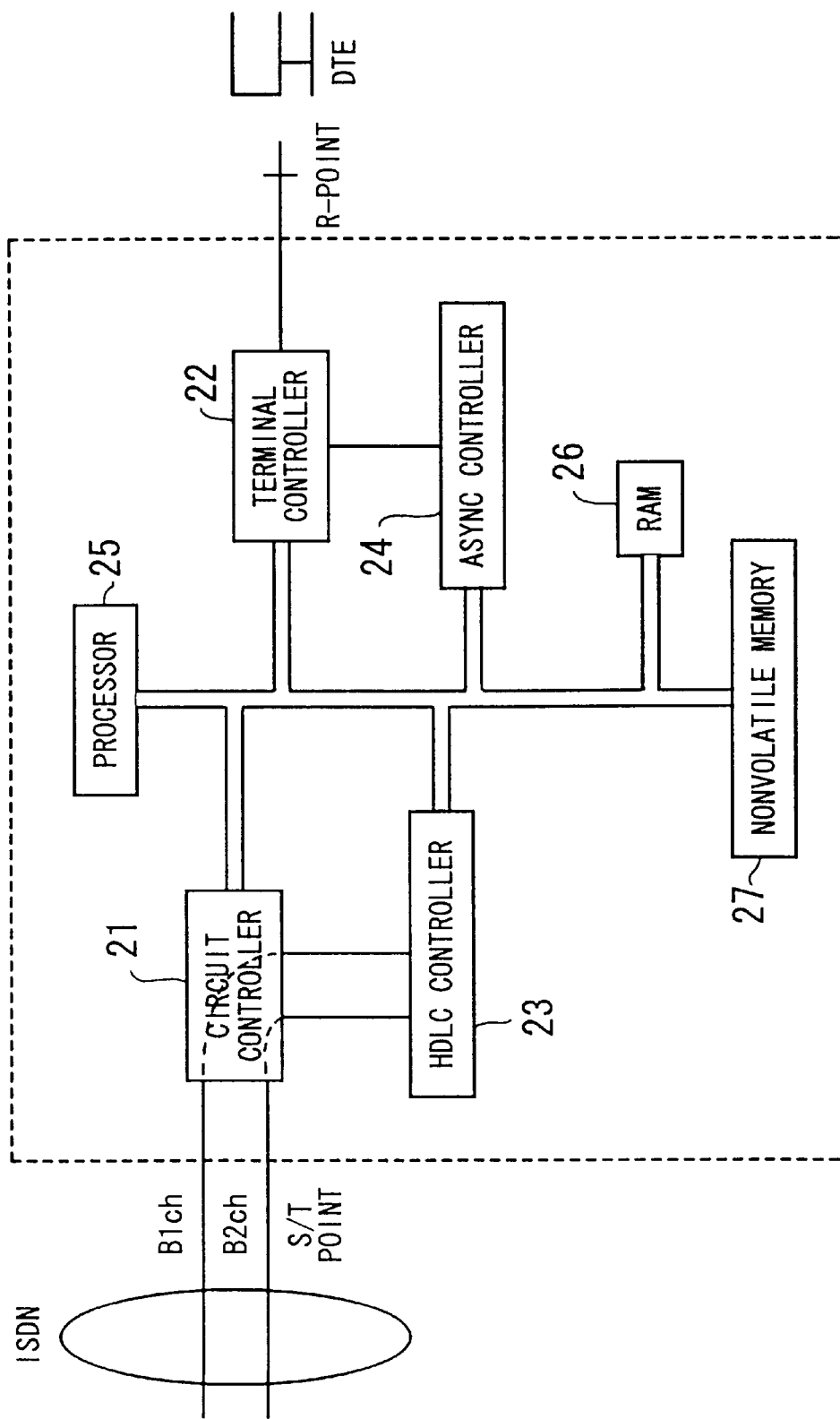
FIG. 3 is a block diagram of a hardware arrangement of the terminal adapter.

FIG. 3 shows in block form a hardware arrangement of the terminal adapter. As shown in FIG. 3, the terminal adapter comprises a circuit controller 21, a terminal controller 22, an HDLC controller 23, an Async controller 24, a processor 25, a RAM 26, and a nonvolatile memory 27. The circuit controller 21 interfaces the terminal adapter with the ISDN. The terminal controller 22 interfaces the terminal adapter with the data terminal device 3. The HDLC controller 23 synchronizes multilink PPP frames. The Async controller 24 adds and deletes asynchronous PPP start and stop bits. The processor 25 processes an authentication request from the peer 1, determines the type of an authentication protocol indicated by the peer 1, disassembles and assembles packets, and encrypts passwords. The RAM 26 stores encryption keys transmitted from the peer 1 and IDs and passwords transmitted from the data terminal device 3. The RAM 26 also provides a work area for analyzing and processing received data. The nonvolatile memory 27 stores firmware.

Operation of the terminal adapter of the hardware arrangement shown in FIG. 3 will be described below with reference to FIGS. 4 and 5.

Figure 4:
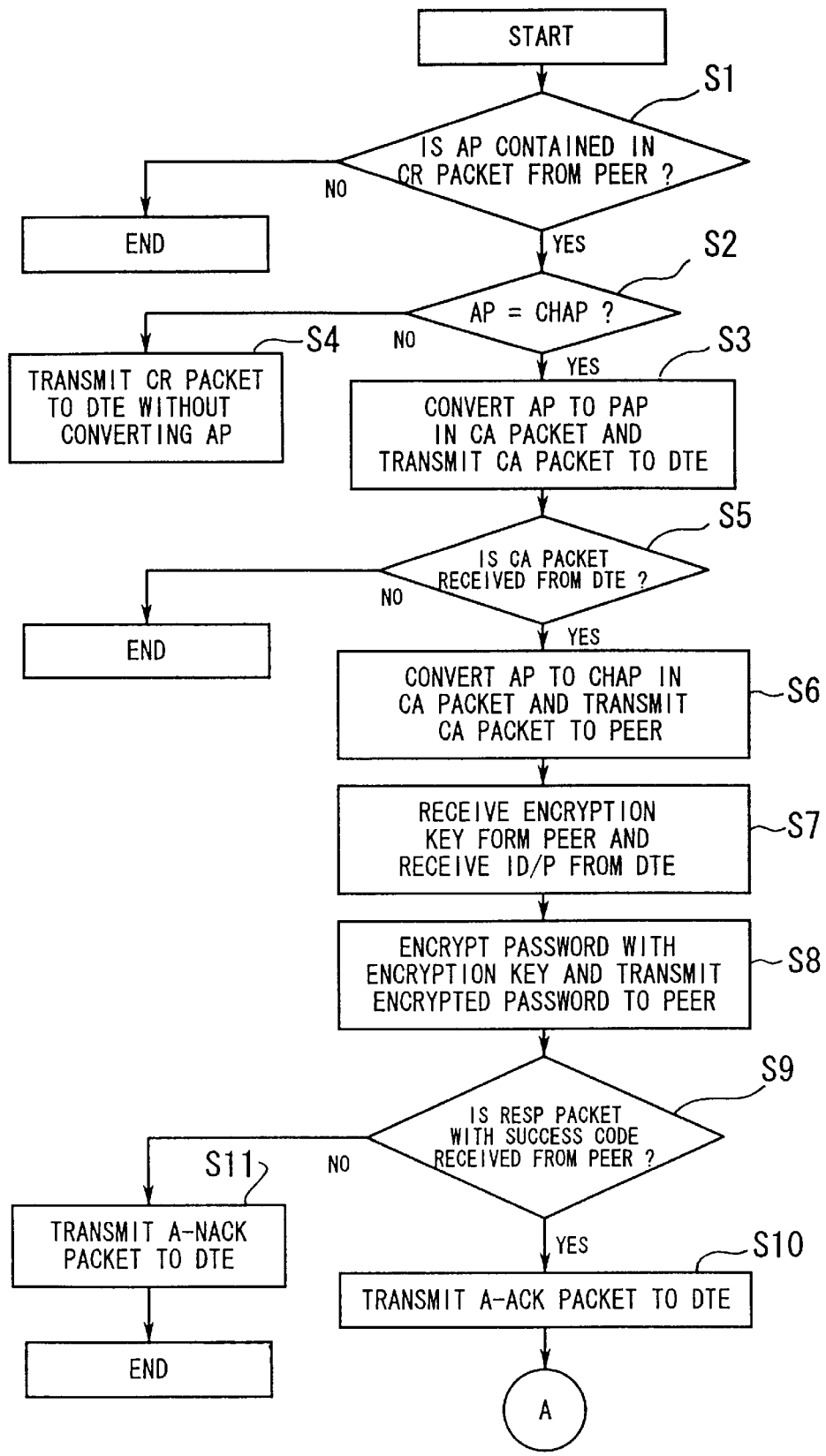
FIGS. 4 and 5 are a flowchart of an authentication process of the terminal adapter.
Figure 5:
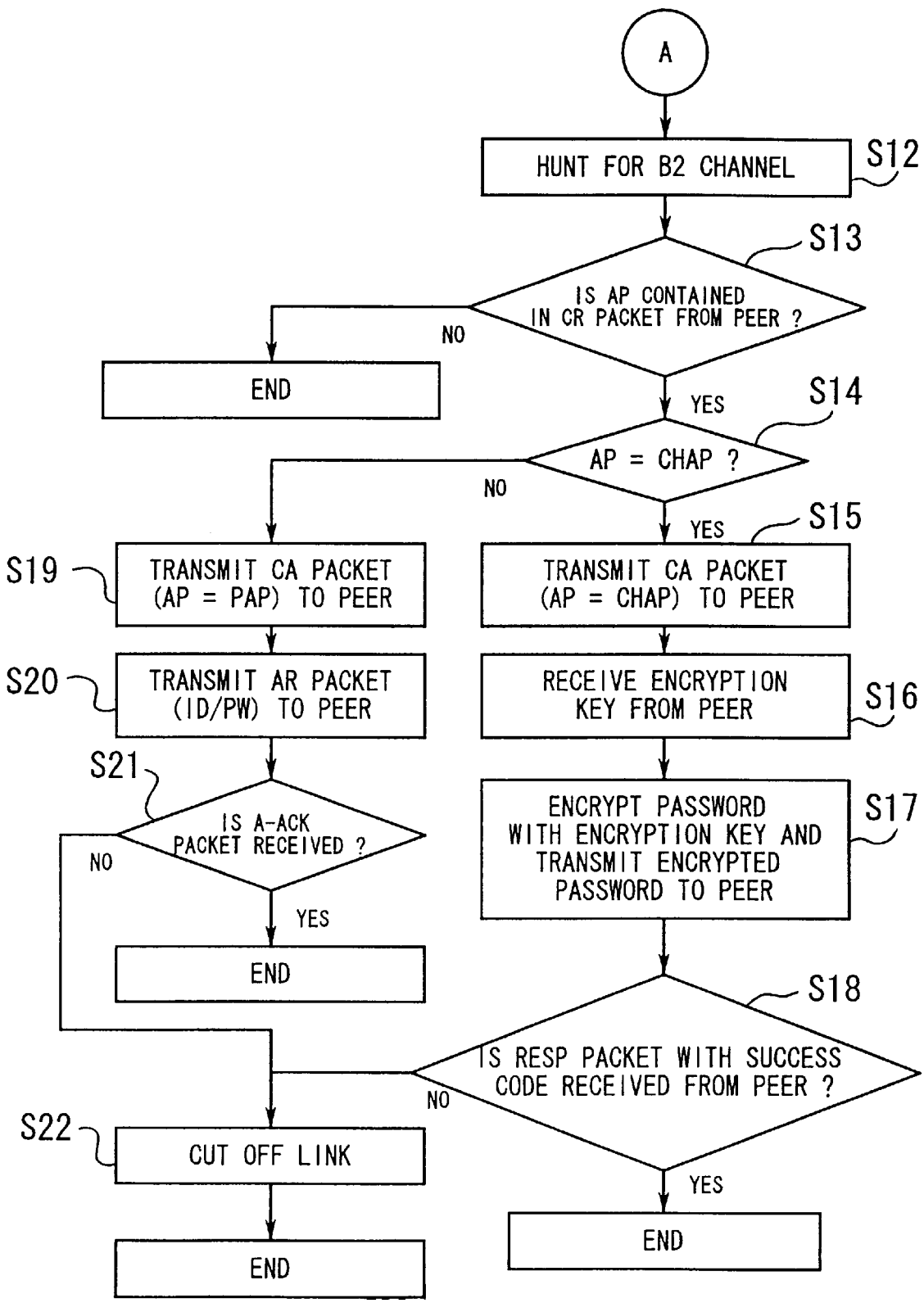

FIGS. 4 and 5 are a flowchart of an authentication process of the terminal adapter. The authentication process of the terminal adapter will be described below with respect to successive steps shown in FIGS. 4 and 5. [S1] Before this step, the B1 channel is called. Thereafter, a CR packet received from the peer 1 is loaded through the circuit controller 21 and the HDLC controller 23 into the RAM 26. If an authentication protocol (AP) is contained in the CR packet, then control proceeds to a step S2. If an authentication protocol (AP) is not contained in the CR packet, then the authentication process is brought to an end.

[S2] It is determined whether the authentication protocol (AP) is the CHAP or not. If the authentication protocol (AP) is the CHAP, then control proceeds to a step S3. If the authentication protocol (AP) is not the CHAP, then control proceeds to a step S4.

[S3] The processor 25 converts the authentication protocol (AP) carried on the CR packet from the CHAP to the PAP, and transmits the CR packet through the Async controller 24 and the terminal controller 22 to the data terminal device 3.

Figure 6:
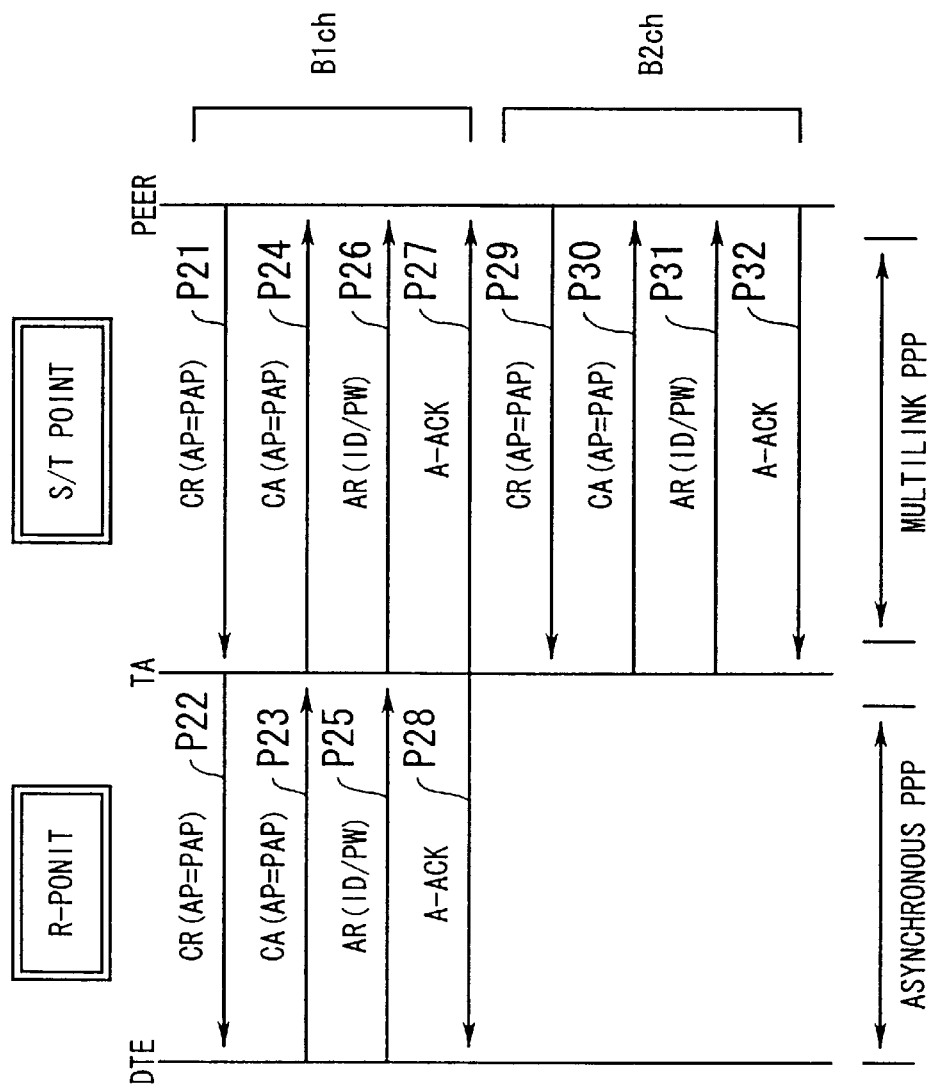
FIG. 6 is a diagram of a link establishing sequence and an authentication sequence according to the PAP.
Figure 7:
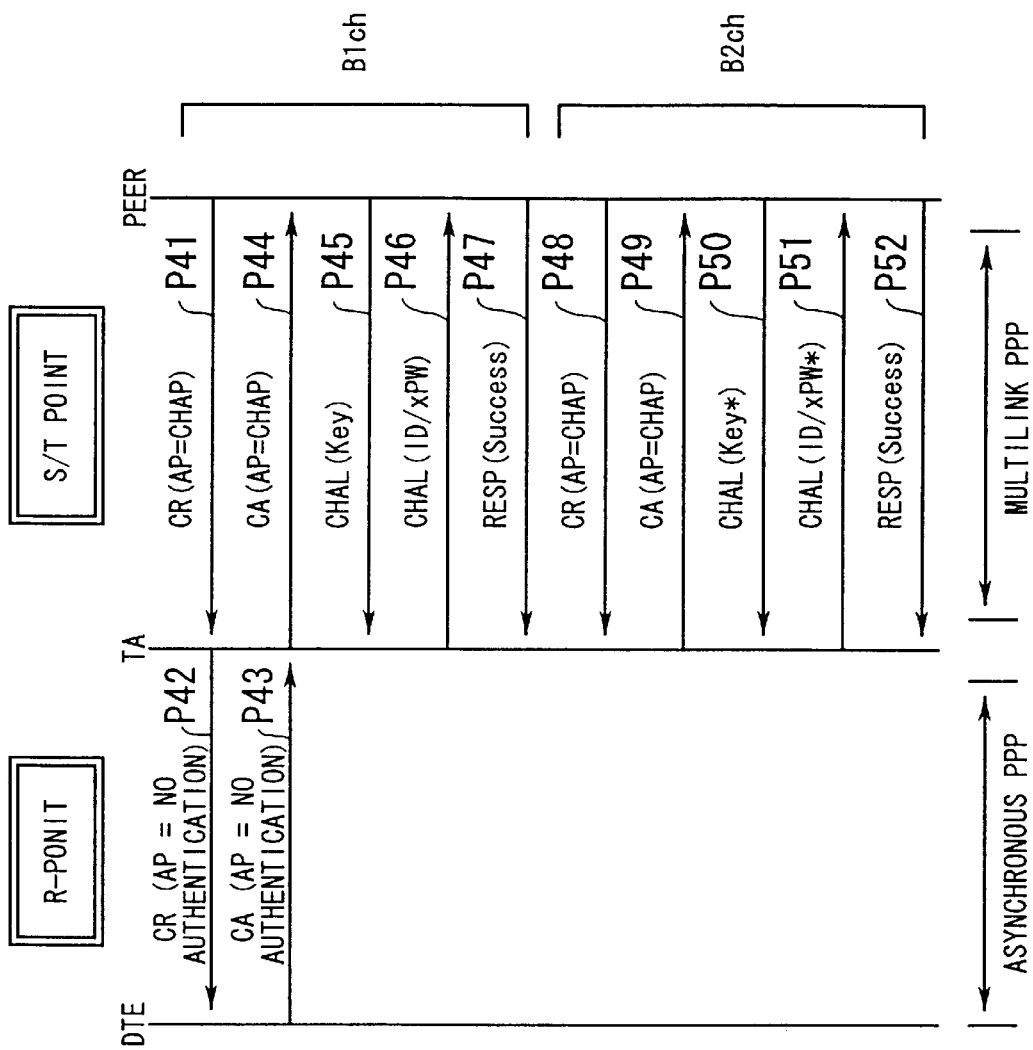
FIG. 7 is a diagram of a link establishing sequence and an authentication sequence according to the CHAP.

[S4] The processor 25 transmits the CR packet through the Async controller 24 and the terminal controller 22 to the data terminal device 3, while maintaining authentication protocol (AP) carried on the CR packet as the PAP. Thereafter, the step P23 and following steps shown in FIG. 6 are carried out.

[S5] When a packet is transmitted from the data terminal device 3 which has received the CR packet, the packet from the data terminal device 3 is loaded through the terminal controller 22 and the Async controller 24 into the RAM 26. The processor 25 determines whether the received packet is a CA packet or not. If the received packet is a CA packet, then control proceeds to a step S6. If the received packet is not a CA packet, then the authentication process comes to an end.

[S6] The processor 25 converts the authentication protocol (AP) carried on the CA packet from the PAP to the CHAP, and transmits the CA packet through the HDLC controller 23 and the circuit controller 21 to the peer 1.

The establishment of a link in the B1 channel is now completed.

[S7] A CHAL packet is received from the peer 1, and loaded through the circuit controller 21 and the HDLC controller 23 into the RAM 26. The processor 25 extracts an encryption key from the CHAL packet, and stores the extracted encryption key in the RAM 26. An AR packet is received from the data terminal device 3, and loaded through the terminal controller 22 and the Async controller 24 into the RAM 26. The processor 25 extracts an ID and a password from the received AR packet, and stores them in the RAM 26.

[S8] The processor 25 reads the encryption key and the password from the RAM 26, and encrypts the password with the encryption key. The processor 25 also reads the ID from the RAM 26, carries the ID and the encrypted password on the CHAL packet, and transmits the CHAL packet through the HDLC controller 23 and the circuit controller 21 to the peer 1.

[S9] When a RESP packet is transmitted from the peer 1 which has received the CHAL packet, the RESP packet is loaded through the circuit controller 21 and the HDLC controller 23 into the RAM 26. The processor 25 determines whether the RESP packet carries a success code representing an authentication success or not. If the RESP packet carries a success code, then control proceeds to a step S10. If the RESP packet carries a failure code representing an authentication failure, then control goes to a step S11.

[S10] The processor 25 transmits an A-ACK packet which represents authentication according to the PAP through the Async controller 24 and the terminal controller 22 to the data terminal device 3.

The authentication process in the B1 channel is now completed.

[S11] The processor 25 transmits an A-NACK packet which represents an authentication failure according to the PAP through the Async controller 24 and the terminal controller 22 to the data terminal device 3. The processor 25 deletes the ID and the password from the RAM 26, and ends the authentication process.

[S12] The B2 channel is called.

[S13] A CR packet received from the peer 1 is loaded through the circuit controller 21 and the HDLC controller 23 into the RAM 26. If an authentication protocol (AP) is contained in the CR packet, then control proceeds to a step S14. If an authentication protocol (AP) is not contained in the CR packet, then the authentication process is brought to an end.

[S14] It is determined whether the authentication protocol (AP) is the CHAP or not. If the authentication protocol (AP) is the CHAP, then control proceeds to a step S15. If the authentication protocol (AP) is not the CHAP, then control proceeds to a step S19.

[S15] The processor 25 sets the authentication protocol (AP) in a CA packet to the CHAP, and transmits the CA packet through the HDLC controller 23 and the circuit controller 21 to the peer 1.

The establishment of a link in the B2 channel is now completed.

[S16] A CHAL packet is received from the peer 1, and loaded through the circuit controller 21 and the HDLC controller 23 into the RAM 26. The processor 25 extracts an encryption key from the CHAL packet, and stores the extracted encryption key in the RAM 26.

[S17] The processor 25 reads the encryption key which has been stored in the RAM 26 in the step S16 and the password which has been stored in the RAM 26 in the step S7, and encrypts the password with the encryption key. The processor 25 also reads the ID which has been stored in the RAM 26 in the step S7, carries the ID and the encrypted password on the CHAL packet, and transmits the CHAL packet through the HDLC controller 23 and the circuit controller 21 to the peer 1.

[S18] When a RESP packet is transmitted from the peer 1 which has received the CHAL packet, the RESP packet is loaded through the circuit controller 21 and the HDLC controller 23 into the RAM 26. The processor 25 determines whether the RESP packet carries a success code representing an authentication success or not. If the RESP packet carries a success code, then the authentication process in the B2 channel is completed (since the multilink comprises the B1 and B2 channels in this embodiment, the entire authentication process is now completed). If the RESP packet carries a failure code representing an authentication failure, then control goes to a step S22.

[S19] The processor 25 generates a CA packet where the authentication protocol (AP) is set to the PAP, and transmits the CA packet through the HDLC controller 23 and the circuit controller 21 to the peer 1.

[S20] The processor 25 reads the ID and the password which have been stored in the RAM 26 in the step S7, carries them on an AR packet, and transmits the AR packet through the HDLC controller 23 and the circuit controller 21 to the peer 1.

[S21] When a packet is received from the peer 1 which has received the AR packet, the processor 25 determines whether the packet from the peer 1 is an A-ACK packet representing an authentication success or not. If the packet is an A-ACK packet, then the authentication process is completed. If the packet is an A-NACK packet representing an authentication failure, then control goes to the step S22.

[S22] Because of the authentication failure, the processor 25 instructs the circuit controller 21 to cut off the B2 channel. Thereafter, the authentication process is ended.

In the above embodiment, the CHAP has been described by way of example as an authentication protocol which uses an encrypted password. However, the principles of the present invention are also applicable to other authentication protocols than the CHAP.

According to the present invention, as described above, in response to an authentication request from the peer according to a first authentication protocol (e.g., the CHAP), the terminal adapter transmits an authentication request according to a second authentication protocol (e.g., the PAP) to the data terminal device. Therefore, for authentication in a first physical circuit, the data terminal device transmits an ID and a password to the terminal adapter according to the second authentication protocol. Using the ID and the password that have been transmitted, the terminal adapter encrypts the password according to the first authentication protocol, and transmits the encrypted password to the peer. At the same time, the terminal adapter holds the ID and the password that have been transmitted. For authentication in a second physical circuit, the terminal adapter uses the ID and the password that have been held thereby to encrypt the password according to the first authentication protocol, and transmits the encrypted password to the peer.

Consequently, it is not necessary to register an ID and a password beforehand in the terminal adapter. As a result, no process is needed to register an ID and a password in the terminal adapter, and when the data terminal device uses a different set of ID and password, it is not required to be registered again in the terminal adapter.

According to the present invention, therefore, by simply registering an ID and a password in an application program (e.g., a PPP dialer) of the data terminal device, an authentication process according to the CHAP can be carried out using an encrypted password. If a plurality of different sets of IDs and passwords are registered in such an application program, then it is possible to selectively use the different sets of IDs and passwords with respect to a plurality of Internet service providers.

Inasmuch as an ID and a password are transmitted from an application program of the data terminal device to the terminal adapter for establishing a link, there is no danger of theft of an ID and a password, which has conventionally been experienced if the terminal adapter is carried away by an unauthorized person.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A terminal adapter for converting data between R-point asynchronous PPP and S/T-point multilink PPP, comprising:

first receiving means for receiving from a peer a first link establishment request packet according to a first authentication protocol using an encrypted password;

first converting/transmitting means for converting the first link establishment request packet received by said first receiving means to a second link establishment request packet according to a second authentication protocol using a password in a text format and transmitting the second link establishment request packet to a data terminal device;

second receiving means for receiving a first response packet according to the second authentication protocol which is returned from said data terminal device in response to the reception of said second link establishment request packet;

second converting/transmitting means for converting the first response packet received by said second receiving means to a second response packet according to said first authentication protocol and transmitting the second response packet to said peer;

first receiving/extracting means for receiving a first challenge packet transmitted from said peer and extracting a first encryption key contained in the first challenge packet;

receiving/holding means for receiving an authentication request packet transmitted from said data terminal device and holding an ID and a password in a text format which are contained in the authentication request packet; and first transmitting means for reading the password held by said receiving/holding means, encrypting the password with the first encryption key extracted by said first receiving/extracting means, reading the ID held by said receiving/holding means, and transmitting the ID and the encrypted password to said peer.

2. A terminal adapter according to claim 1, further comprising:

controller and data storage means for receiving a third response packet according to said first authentication protocol, said third response packet containing an authentication result which is produced by said peer based on the encrypted password and the ID transmitted by said first transmitting means; and processor means for converting the third response packet received by said controller and storage means to a fourth response packet according to said second authentication protocol and transmitting the fourth response packet to said data terminal device.

3. A terminal adapter according to claim 1, further comprising:

second receiving/extracting means for receiving a second challenge packet transmitted from said peer and extracting a second encryption key contained in the second challenge packet; and second transmitting means for reading the password held by said receiving/holding means, encrypting the password with the second encryption key extracted by said second receiving/extracting means, reading the ID held by said receiving/holding means, and transmitting the ID and the encrypted password to said peer.

4. A terminal adapter according to claim 1, further comprising:

controller and data storage means for receiving from said peer a third link establishment request packet according to said first authentication protocol; and processor means for transmitting a third response packet according to said first authentication protocol to said pair when said third link establishment request packet is received if the third link establishment request packet is received after said second response packet is transmitted.

* * * * *